United States Patent [19]

Falkenberg

[11] 4,086,693

[45] May 2, 1978

[54] MANUFACTURE OF CONSTRUCTION ELEMENTS

[76] Inventor: Johan Caspar Falkenberg, Fjordveien 59 c, N-1322 Hovik, Norway

[21] Appl. No.: 794,657

[22] Filed: May 6, 1977

Related U.S. Application Data

[60] Continuation of Ser. No. 656,847, Feb. 10, 1976, abandoned, which is a division of Ser. No. 543,301, Jan. 23, 1975, Pat. No. 3,961,407.

[51] Int. Cl.² .......................................... B23P 11/00

[52] U.S. Cl. .......................................... 29/432; 29/238; 29/455 LM; 113/116 A

[58] Field of Search .......................... 29/432, 446, 432.1, 29/432.2, 238, 455 LM; 113/116 A

[56] References Cited

U.S. PATENT DOCUMENTS

| | | | |
|---|---|---|---|
| 2,255,658 | 9/1941 | Friedman | 113/116 F |
| 2,970,373 | 2/1961 | Kohl | 29/238 |
| 3,036,672 | 5/1962 | Kohl | 29/455 LM |
| 3,574,253 | 4/1971 | Kay | 29/155 |
| 3,640,556 | 2/1972 | Bennett | 29/432 |
| 3,678,558 | 7/1972 | Fredericks | 29/446 |

*Primary Examiner*—Victor A. DiPalma
*Attorney, Agent, or Firm*—Watson, Cole, Grindle & Watson

[57] ABSTRACT

Construction elements comprising two parallel nailable plates interconnected by corrugated metallic web sheets extending edgewise between them and having teeth at their edges embedded in the plates are made by placing the bottom plate thereof in a movable frame having displaceable abutments connected to clamping means. The web sheets are placed in positions so as to be clamped at their extremities by clamping said means, the extremities of longitudinal sheets being pinched in folds of transverse end sheets. Also, interlocking deformations are punched in the adjoining webs. The clamping means are moved for stretching the sheets, the upper plate is placed on top, and web sheets and plates are brought into correct relative positions by corresponding positioning of the abutments. In addition longitudinal web sheets extending along edges of the element are supported externally between clamping points by spring-loaded rulers connected to abutments so as to ensure correct spacing from the plate edges. With the components of the element thus aligned, the frame is moved into a press and the components are pressed together, the abutments yielding vertically against a spring-load. Then the frame with the element is removed from the press, and the grip by the abutments and clamping means is released. For permitting stepwise pressing of elements longer than the press, the latter has a smoothly converging entrance portion. In its preferred form, the web sheet has a largely trapezoidal corrugation, a Z-shaped cross-section of the teeth and shallow depressions between the consecutive teeth, suited as starting points for folds to be formed.

8 Claims, 29 Drawing Figures

FIG. 5a
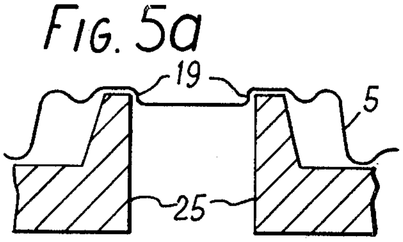
FIG. 6
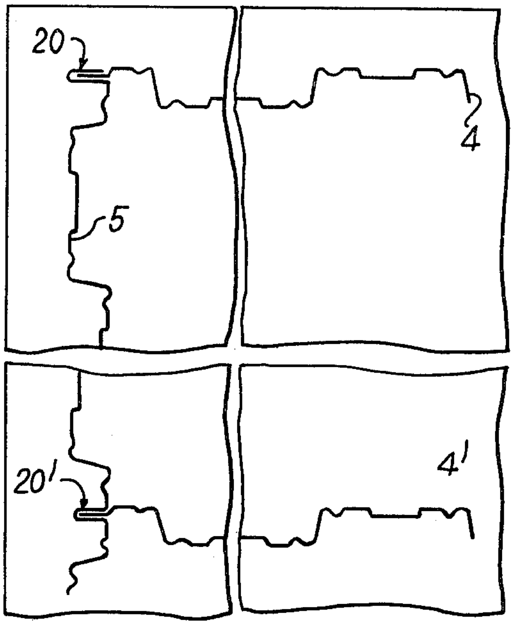
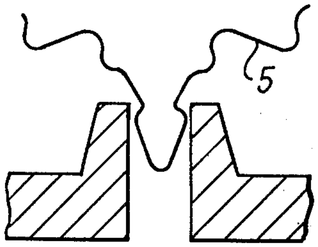
FIG. 5b
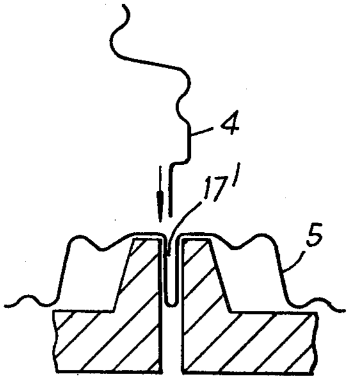
FIG. 5c
FIG. 7
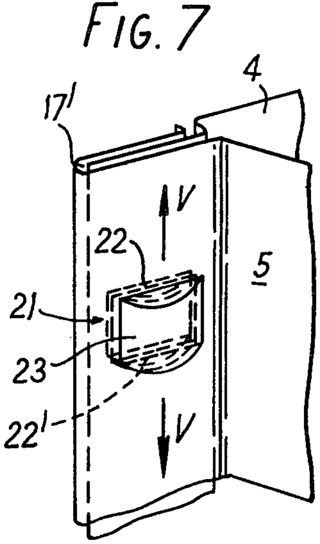

MANUFACTURE OF CONSTRUCTION ELEMENTS

This is a continuation of application Ser. No. 656,847 now abandoned filed Feb. 10, 1976 which was a divisional application of Ser. No. 543,301 now U.S. Pat. No. 3,961,407 filed Jan. 23, 1975.

BACKGROUND OF THE INVENTION

This invention relates to construction elements of the kind comprising two plates of nailable material and web strips that hold the plates together in spaced apart relationship and consist of elongated sinuous sheet metal strips having teeth along their longitudinal edges embedded in the respective plates, and to a method and apparatus for the manufacture of such elements on a commercial scale.

More particularly, the invention relates to the manufacture of construction elements of the kind described in U.S. Patent Applications Ser. Nos. 327 924, now U.S. Pat. No. 3,872,641 and 497 828, now U.S. Pat. No. 3,938,289, wherein the preferred embodiment has the form of a closed box with bottom and top (flange plates) of a nailable plate material such as plywood, particle board or fibre board. The side walls (webs) of the element comprise sheet metal strips such as galvanized steel, which are bent or corrugated in the transverse direction and shaped with dowel-like teeth along their longitudinal edges. The element is assembled in a pressing operation whereby the teeth of the web strips are pressed into the plates so as to provide a connection of considerable strength and stiffness.

In previous publications relating to structures of the above kind, such as German published patent specification No. 1 004 790 and U.S. Pat. No. 3 538 668, nothing is disclosed about how such elements may be produced, and especially how the web strips prior to the pressing operation can be held in their proper positions with a predetermined distance between the edges of the plates and the web strips, how completely closed elements should be manufactured, or how long elements may be pressed with a short press. As pointed out in applicant's above mentioned patent application, the shapes of web strips and teeth disclosed in the abovementioned previous publications, are not suitable for use in load-bearing elements and, as far as is known, have never found any practical use.

Load-bearing elements of the kind mentioned in the preamble may, in particular, be used as floor and roof elements in smaller buildings, such as residential houses, and will therefore have a place in modern commercial housing manufacture. It is feasible to manufacture such elements in modular dimensions, for example, in widths of 60 and 120 cm, if desired up to 240 cm, and in lengths up to 12 m.

For the bottom and top of a box-shaped panel element, particle board is a suitable material because it is cheap and is produced in large sizes, and at the present time has qualities suitable for use in load-bearing components.

Very high dimensional precision is required if such elements are to be installed on the building site without appreciable finishing work such as sanding or puttying and to form sub-floors upon which floor covering such as linoleum or carpets are to be laid.

In order to ensure such dimensional precision and hence a correct fit between individual panels, the manufacturing method will have to meet a number of conditions which will be discussed briefly below.

Firstly, the web strips must be placed and kept in correct positions prior to the pressing operation. This means that they must be placed vertically between the bottom and top plates and stand straight along the plate edges, in the sense that the extreme points of the corrugated contour lie on a straight line which is parallel to the plate edges at a certain specified distance from these. Deviations in this respect complicate the sealing and connection between adjacent elements and give the finished elements an unsatisfactory appearance.

Secondly, the top and bottom plates should be held in correct relative positions so that the plate edges are at all points aligned in the vertical direction. If one plate is displaced relative to the other, problems will arise when the elements are to be installed and joined, since there will appear unsightly clearances between adjacent top or bottom plates. Actually, the mutual displacements between top and bottom plates should at no point exceed 1 mm, a requirement which for elements of a length of, say, 8 m or more, call for rather rigorous measures.

Thirdly, the total height (thickness) of the panel after pressing should be kept within very close tolerances, for example ± 0.2 mm. Larger deviations in this dimension yield a noticable step in the joint between adjacent elements and call for additional finishing operations on the building site.

Fourthly, it is of considerable practical importance that the production machinery can quickly and simply be adjusted from one element size to another. This consideration applies to the length as well as to the width of the element and, to a smaller extent, also to the height.

Further, for the manufacture of large elements, it is important that the pressing of the element does not call for a press which is as long as the element itself, since a press of for example 12 m length would be very demanding with regard to both cost and space and, besides, could not be utilized to its full capacity.

SUMMARY OF THE INVENTION

The present invention provides a method for the commercial manufacture of construction elements of the kind described above which permits elements of large sizes to be produced in a rational manner and with very good dimensional accuracy. Further, the invention provides an apparatus for the manufacture of panel elements according to the method of the invention.

With a view to solving the problems and fulfilling the requirements discussed above, the method according to the invention chiefly consists in using web strips which are somewhat underdimensioned relative to their length in the finished element, and gripping the web strips with displaceably mounted gripping means and then mutually displacing the gripping means so as to stretch the web strips in their length directions to their respective desired lengths, whereafter the web strips and the top and bottom plates of the elements are brought into mutually correct positions and pressed together. The apparatus of the invention is accordingly primarily characterized in that means are mounted on a supporting structure which are movable relative to each other are adapted to grip the extremities of the web strips and are adapted to be displaced relative to each other in the length directions of the web strips and thereby stretch the strips to their respective desired lengths and to keep them in this stretched condition during the pressing operation. Aligning means are also mounted for vertically aligning the plates relative to each other and to the stretched web strips.

Thus, the invention makes it possible to ensure that warps and unintentional curvatures in the web strips are eliminated and that the individual parts of the panel element are held in correct mutual positions during pressing and in such a way as to afford a high dimensional precision, and also permits the production to be carried out quickly and efficiently.

The invention also permits long elements to be produced with the use of a relatively short press by pressing such long elements in several stages and by using press plates which are shaped with slightly convergent entrance zones which form a smooth transition between that part of the element which is completely pressed and that part of the elements which have not yet been pressed.

The method according to the invention may conceivably be carried out with a large variety of means. Thus, the mentioned gripping- and centering means may be mounted on an endless chain, whereby the individual parts of the element are moved to a pressing site where the chain is held under tension, and from where this chain thereafter moves the finished element out. However, it is preferred to use a rigid frame on which the gripping and centering means are mounted for mutual displacement, so that by mutually displacing these means the web strips can be stretched and the plates can be brought into correct positions relative to the web strips and to each other.

Further features and advantages of the method and the apparatus according to the invention will become apparent from the following description of a preferred embodiment provided for the production of panel elements according to U.S. Pat. No. 3,938,289 and with a preferred embodiment of web strips having a trapezoidal main corrugation profile and a corresponding Z-shaped tooth profile, and with the extremities of the longitudinal web strips clamped into folds in transverse web strips. The corrugation shape of the web strips may be adapted to the building module M = 100 mm.

BRIEF DESCRIPTION OF THE DRAWINGS

FIG. 5 *a–c* shows diagrammatically in horizontal section three different stages of the formation of a fold connection between two web strips meeting at a right angle.

FIG. 6 shows in horizontal section the connection between longitudinal and transverse web strips in the elements of FIG. 1.

FIG. 7 shows in perspective view and on an enlarged scale a deformation connection between longitudinal and transverse web strips.

DETAILED DESCRIPTION OF THE PREFERRED EMBODIMENT

Figure 1:
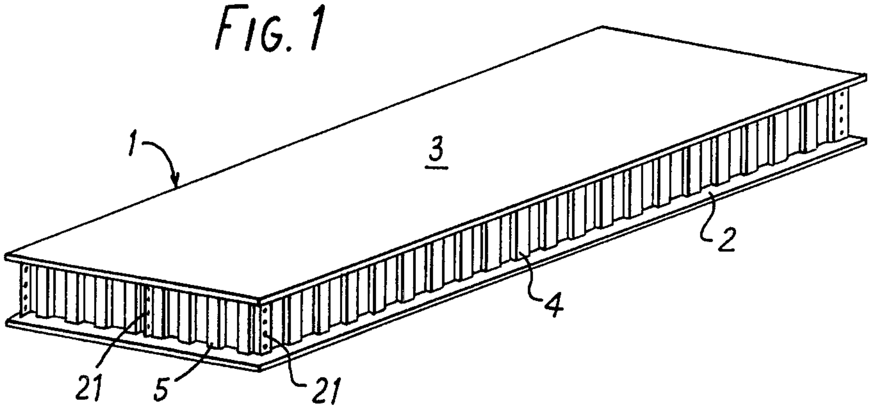
FIG. 1 is a perspective view of a box-shaped panel element of the type described above.
Figure 2:
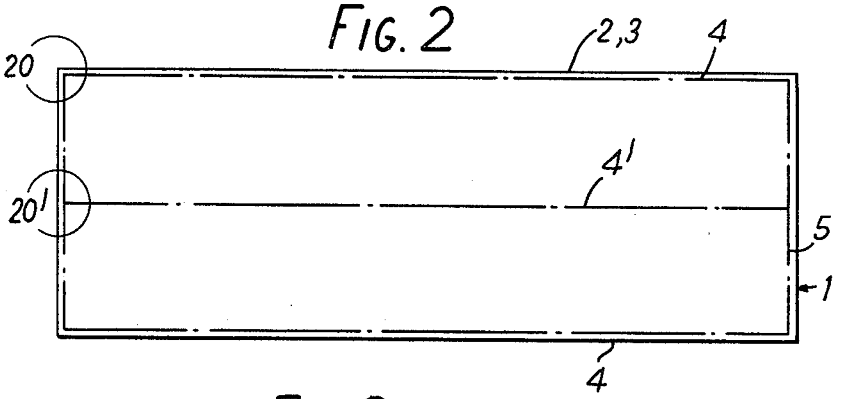
FIG. 2 is a diagrammatic plan view of the elements, showing the location of the web strips within the element shown in FIG. 1.

FIGS. 1 and 2 show a box-shaped panel element 1 comprising a lower plate 2, a top plate 3, longitudinal web strips 4, 4' and transverse end web strips 5, which are locked to longitudinal strips 4, 4' by deformation connections indicated at 21. FIG. 2 shows the positions of the web strips in element 1. The element thus forms a closed box and may be filled with mineral wool or other suitable insulating material. The top and bottom plates 3, 2 (flange plates) may be of particle board or plywood with a thickness of for example 10–20 mm, and the element height (thickness) may be typically 15–30 cm, the width 1.20 m or more and a length up to 12 m.

Figure 3:
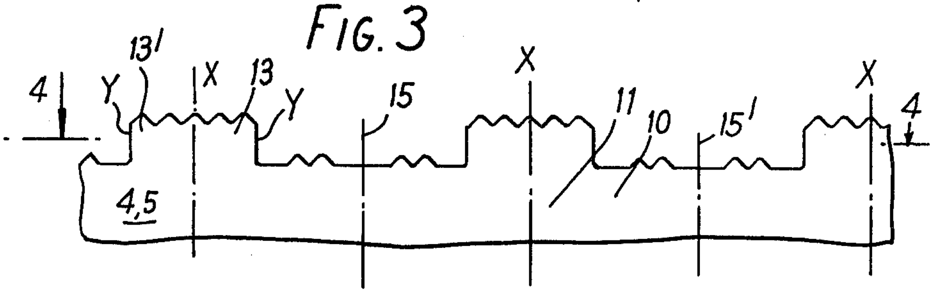
FIG. 3 is an elevational view of the edge portion of a blank for the web strips prior to being formed into a corrugated shape.
Figure 4:
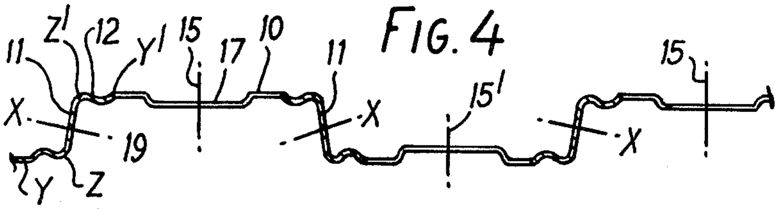
FIG. 4 shows the web strips in section along the line 4—4 on FIG. 3 after corrugation.

A typical web strip for the element in FIG. 1 is shown in a broken view in FIGS. 3 and 4. FIG. 3 shows a portion of the longitudinal edge of the web strip in flat condition, i.e., before the strip is bent along transverse fold lines into the profile shown in FIG. 4. The basic shape is a shallow trapezoidal corrugation with rather wide teeth which are located in such a way that they acquire a Z-shaped cross-section. The parallel, longitudinal portions 10 of this profile are near the transition of transverse portions 11 shaped with a stiffening groove 12, which primarily serves to afford a local stiffening of the flange portion 13, 13' of the Z-shaped teeth, which can thereby be made relatively wide without the free edges Y, Y' of the tooth buckling while being pressed into the flange plates. The wide flange portion of the tooth contributes considerably to the bending strength of the tooth in a direction transversely to the transverse portion 11 and also serves to give the tooth an increased pull-out anchoring strength by providing a larger tooth area as compared to a tooth with a simple Z-profile.

Symmetrically about the transverse planes of symmetry 15, 15' between subsequent teeth, the longitudinal portions 10 are shaped with shallow, troughlike depressions 17. The object of these is firstly to provide a local stiffening of the portions which, due to their relatively large width, might otherwise be subject to buckling during the pressing. Secondly, such a trough-shaped depression 17 may serve as a starting point for a narrow fold within which a transversely adjoining web strip may be connected to the web strip 5.

This is shown in FIGS. 5*a–c* which illustrate a pair inwardly movable of jaws 25 which, clamp the side edges 19 of the trough so as to pinch these edge together into a narrow fold 17' a web strip 4 disposed at right angles to strip 5, can be inserted into fold 17 and locked to web strip 5 with rivets, spot welds, or by a deformation connection as described below with reference to FIGS. 7 and 13.

FIG. 6 shows how the longitudinal web strips 4, 4' are connected to the transverse strips through folding connections 20, 20' as described above. The web strips are furthermore locked together by a number of deformation connections 21 as shown in detail in FIG. 7. The lock 21 is formed by punching or shearing a loop-shaped protruding portion 23 in fold 17', the three layers of sheet metal being cut along lines 22, 22' and the intermediate portion 23 being pressed out in the shape of a shallow loop. Thereby vertical forces V may be transferred between web strips 4 and 5 through the mutual abutting contact between the sheared faces in the respective strips.

This force-transferring connection between the longitudinal web strips 4, 4' and the transverse strips 5 gives the element 1 a considerable torsional strength and makes it possible to support the element at the ends in points located away from the longitudinal web strips, so that the elements can extend freely across window openings in the supporting wall.

The web strips are preferably made from hot galvanized sheet steel of 0.5 mm thickness. The trapezoidal corrugation profile shown having a Z-shaped tooth profile and stiffening grooves 12 and trough-like depressions 17 enables the web strips to be produced with a period length (distance between the symmetry lines 15, 15 for similarly oriented trapezia) of about 100 mm without the tooth being bent or the web strips buckling during the pressing operation. In practice, a period length of approximately 95 mm may be chosen, since the strip, as subsequently explained, is to be stretched about 5% when set up in the jig.

This has the great practical advantage that when, from a coil of web strip, a strip for an element of say 8 m length is to be cut, it is not necessary to measure this length, as it is sufficient simply to pass the strip through a counting device which counts 80 periods and thereafter cuts the strip along a line of symmetry 15. This strip will then have a length of about 760 cm and be stretched in the jig to 795 cm, leaving at either end of the element a distance of 25 mm between the web strip and the plate edges.

With regard to the transversal end strips, the same procedure may be followed, the formation of the fold 17' providing a desirable additional shortening which is necessary since in this case the edge distance of 25 mm at either end in relation to the short strip length requires the web strip to be underdimensioned somewhat more than 5%. The formation of the fold 17' may conceivably be effected in the stressing jig by arranging the jaws of the clamping units as having a sufficient stroke length to clamp the trough-shaped depressions 17. Normally, however, it will be more practical and will in the following description be presumed that the folds 17' are formed in a prior, separate operation, so that also the end web strips are suitably underdimensioned when they are mounted in the jig.

Figure 9:
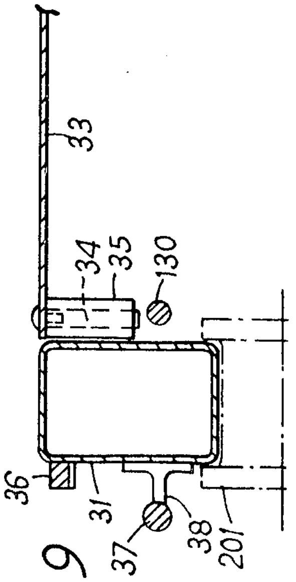
FIG. 9 shows on an enlarged scale a vertical section taken substantially along line 9—9 in FIG. 8.

A pre-requisite for employing a period length of 100 mm for web strips with such a small material thickness as 0.5 mm, is, however, that longitudinal portions 10 are stiffened as explained above. Consequently, it will be understood that this particular web shape, which is shown in FIG. 9 of the aforementioned U.S. Pat. No. 3,938,289, constitutes a very valuable development of the simple trapezoidal shape shown in FIG. 13 of U.S. Pat. No. 3,872,641.

There will now be described a tensioning frame or jig for the setting up of elements for pressing. The jig is shown diagrammatically in its main features in FIG. 8, and further details are shown in FIGS. 9 to 19.

The jig 30 has the shape of a frame comprising a pair of longitudinal beams 31, preferably in the form of rectangular hollow sections, rigidly connected to end beams 32, for example of flat steel. The frame has a bottom plate 33 (FIG. 9) which may be a thin steel plate. The bottom plate is connected to the longitudinal beams 31 through bolts 34, which can move vertically in guides 35 fixed to the beams 31. The plate 33 is fixed to the bolts 34 with screws and can therefore be lifted relative to the beams 31. In its lowermost position the plate 33 rests on the guides or sleeves 35, the top of the plate being in alignment with the top of the beams 31, as shown in FIG. 9. On the outside of each beam 31 there are attached a toothed rack 36 and a guide rail 37, for example in the shape of a round steel for which at intervals is attached to T-shaped brackets 38, which in turn are attached to the beams 31 with screws or by other suitable means (not shown).

The frame 30 further includes a pair of mutually movable transoms 40, one of which (to the right in FIG. 8) is preferably fixed near the end of the frame while the other is mounted movably along the frame. On the transoms 40 are placed clamping units 70, 70', in which the transverse and longitudinal web strips can be clamped and locked together. The clamping units 70 can be moved along the transoms and thereby stretch the end web strip 5 and, by moving the movable transom 40 in a direction away from the fixed transom, preferably by means of a driving unit 50 with motor, the longitudinal strips 4 can be stretched.

Still further, the frame 30 includes a pair of longitudinal rails 120, 120', which are placed inside the beams 31 and can be moved translatorily and synchronously towards and away from each other. On the side rails 120, 120' are placed detachable holding means 140, which carry aligning rulers 160. These rulers 160 support the longitudinal strips 4 externally and ensure, together with the holders 140, that the external web strips 4 remain upright in a straight line parallel to and correctly spaced from the longitudinal edges of the plates.

The frame 30 has such dimensions that the largest possible distance between the transoms 40 is somewhat greater than the greatest element length contemplated and the maximum possible distance between the opposite edges of the aligning rulers 160 is somewhat larger than the greatest element width to be considered.

Figure 12:
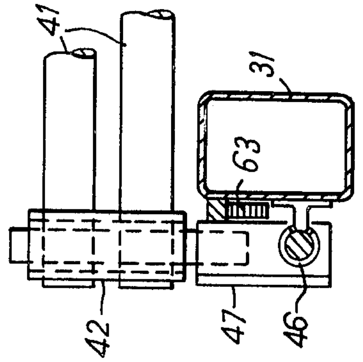
FIGS. 10 to 12 show certain details on a movable crossbeam for the jig in plan, elevation and vertical section taken along line 12—12 of FIG. 11, respectively.
Figure 11:
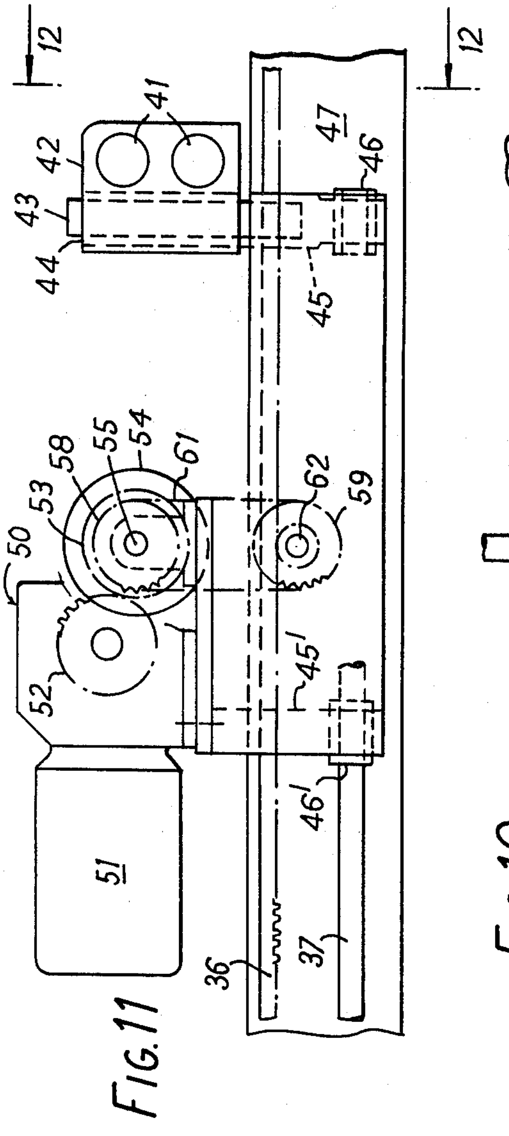
Figure 10:
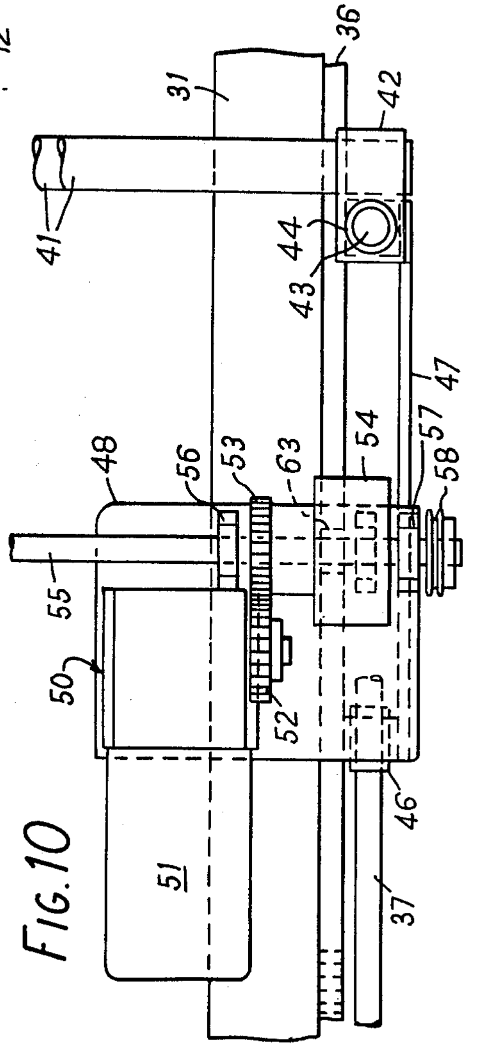

Various details of movable transom 40 are shown in FIGS. 10 to 12. This transom comprises two steel bars 41 (tubular if desired) extending across the jig throughout the width of the latter. The steel rods 41 are fixed at each end to a block 42 which can move somewhat in a vertical direction on a guiding post 43, preferably with a ball bushing or sleeve 44. The guiding post 43 is rigidly mounted in a block 45, in which an open ball bushing 46 is also mounted, which runs on the steel bar 37. Further, block 45 is mounted on a side plate 47 rigidly connected to another open ball bushing 46', which together with the side plate 47 carries a horizontal mounting plate 48 for the driving unit 50. The driving unit 50 includes a motor 51 with a suitable reduction gear, the driven shaft of which carries a gear 52 which, through another gear 53 and a suitable disconnectable coupling 54, drives a shaft 55 which extends throughout the width of the jig 30. The shaft 55 is journalled near its ends in suitable bearings 56 and 57 and carries sprocket wheels 58 at its ends. Each of the sprocket wheels 58 drives a lower sprocket wheel 59 through a short chain drive 61. The sprocket wheel 59 is mounted on a short shaft 62 which in a suitable way is journalled on the bottom side of the mounting plate 48, and which on its other end carries a gear 53 which meshes with the tooth rack 36.

At the other end of the movable transom 40, the arrangement is similar as shown in FIGS. 10 to 12, however, without the driving unit 50, the gears 52, 53 and the coupling 54.

With the arrangement shown in FIGS. 10 to 12, the transom 40 can move back and forth along the jig frame 30 and, due to the two gears 36 which run synchronously on the racks 36, the transom will always be exactly at right angles to the length direction of the frame. The coupling 54 may preferably be of the electromagnetic friction type which protects the driving unit from over-loading, and which disconnects the transom gears from the motor when the current to the motor 51 is interrupted. Thereby, the transom 40 can easily be moved manually back and forth along the jig frame for quick adjustment, whereas the motor 51 is used when the web strips 4, 4' are to be tensioned.

The clamping units for the web strips 4, 5 will now be described with reference to FIGS. 13 to 16, which show such a clamping unit 70. As shown, this unit comprises a box 71 open at the top and the bottom and having holes in the side walls 72 permitting the box to slide along the rods 41 of the transom 40. On the front wall 73 of the box a plate 74 is supported for movement along the wall 73 via T-grooves and rails 77 as shown in cross-section in FIG. 15. Furthermore, a second plate 75 is fixed on the front wall 73. Jaws 76 and 76' are fixedly secured to movable plate 74 and the fixed plate 75. The position of the jaw 76 relative to the plate 74 can be regulated somewhat by means of a couple of adjusting screws 79 engaging screw-threaded bores in a reaction plate 78 on the plate 74, the holes for the fixing screws in the jaw 76 being shaped somewhat oblong (not shown) in order to allow for horizontal adjustment. For reasons of clarity, the parts 76–78 are not shown in FIG. 14.

The plate 74 with the jaw 76 can be displaced toward and away from the fixed jaw 76' by means of a shaft 81 which carries a hand lever 82 and extends through the box 71 between the rods 41, and which is journalled, preferably in needle bearings, in the front wall 73 and the opposite wall 73' of the box. The forward end portion of the shaft 81 is shaped as a crank or circular excentric 81', which moves the plate 74 horizontally through a bronze block 83, which can move with vertical guidance in a rectangular hole 84 in the plate 74, as shown in FIG. 14. Thereby a rotation of 180° of the shaft 81 with the handle 82 will move the jaw 76 from the closed position shown in FIG. 13 to an open position.

In the movable jaw 76 are mounted punching elements 85, and in the fixed jaw 76' are formed corresponding recesses or grooves 86 (FIGS. 13 and 15) for the formation of the deformation connections as shown in FIG. 7.

The parts of the clamping unit 70 so far described are sufficient for clamping and locking longitudinal and transverse web together. In the form of the jig shown in FIG. 8, with three such clamping units on each transom, the central units 70' have only this function, and these units therefore do not need to include further parts than those described so far. These units are fixed on the transoms 40, for example with a set screw 87 (FIG. 13).

The outer clamping units 70 also function to stretch transverse strips 5 and therefore have to be somewhat movable along the respective transoms 40. This stretching movement takes place through a cam element 91 (FIGS. 13, 15 and 16) which is fixed to the shaft 81 and pushes against the one or the other side wall 92, 92' of a U-shaped element 90 which is fixed to the transom rod 41 with a pin 93 (FIG. 15), which extends into a bore in the rod 41.

The cam element 91 is shaped so that the clamping unit 70 performs its entire movement for stretching the end strip 5 during the first approximately 90° rotation of the shaft 81 from a starting position where the jaws 76, 76' are in the open position. During the remaining part of the rotation of the shaft it is only the jaw 76 that moves in order to clamp the transverse web strip to the extremity of the longitudinal strip. This is necessary in order that when the element has been pressed, it be possible to loosen the jaws sufficiently to move the transoms from each other so as to permit the element to be lifted out of the jig frame.

In addition to the described gripping devices, the units 70 are also equipped with aligning or locating means for locating the top and bottom plates of the element so that these plates will lie in correct positions in relation to each other and also to the web strips. As shown in FIGS. 13 and 14 and as described below, this function is performed by means of two sets of vertically movable, spring-loaded abutting pins which engage the plate edges and prevent the plates from moving out of position in a transverse as well as in a longitudinal direction.

To the plate 73 there is fixed a tube 100 accommodating a pair of vertical pins 101, 101' and an intermediate compression spring 102. Vertical movements of the pins are limited by stopping pegs 103, 103', running in slots 104, 104' in the tube 100. The pins 101, 101' as well as corresponding pins on the opposite transom engage the terminal edges of the top and bottom plates, respectively, and ensure that these edges remain aligned vertically and do not move out of position. Due to the pins being able to be pushed into the tube 100, they can follow the movement of the flange plates of the construction element when these are pressed onto the web strips.

In order that after the bottom plate of the element has been placed on the bottom plate 33 of the jig with one edge abutting the lower locating pins of the fixed transom 40, the movable transom 40 can be displaced somewhat inwardly over the element bottom plate, so that the underdimensioned web strips 4, 4' can be placed in the clamping units 70, 70', the lower locating pin 101' is adapted to be lifted by a lever 105 pivoted on an axis in a point A (FIGS. 13, 15 and 16) on the front wall 73. The lever 105 bears against the peg 103' and against the cam element 91 so that the latter upon the rotation of the shaft 81 can cause lifting of the pin 101' against the pressure of the spring 102. When the unit 70 is closed and tensioned (i.e the jaw 75 is in the position to the right as shown in FIG. 13), the position of the lever 105 is as shown in full lines in FIG. 16. When the shaft 81 is rotated 180° back to the starting position, so that the unit moves to the left and the jaws open, the peg 103' and hence the locating pin 101' are lifted as shown in dotted lines in FIG. 16.

Figure 13:
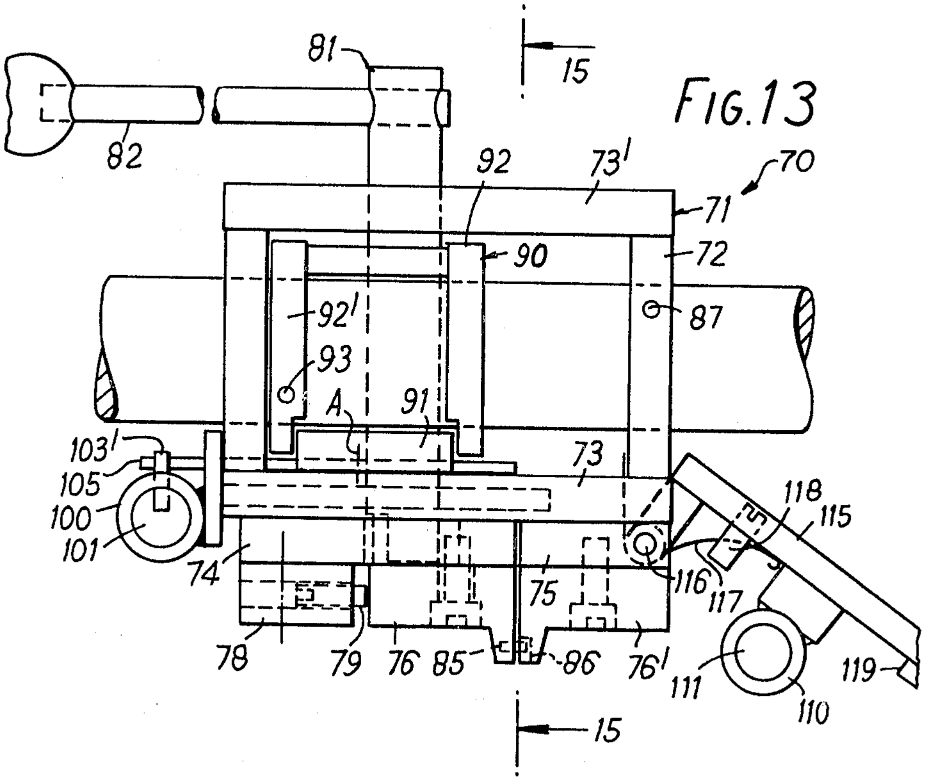
FIG. 13 is a plan view of a clamping unit on the jig.
Figure 14:
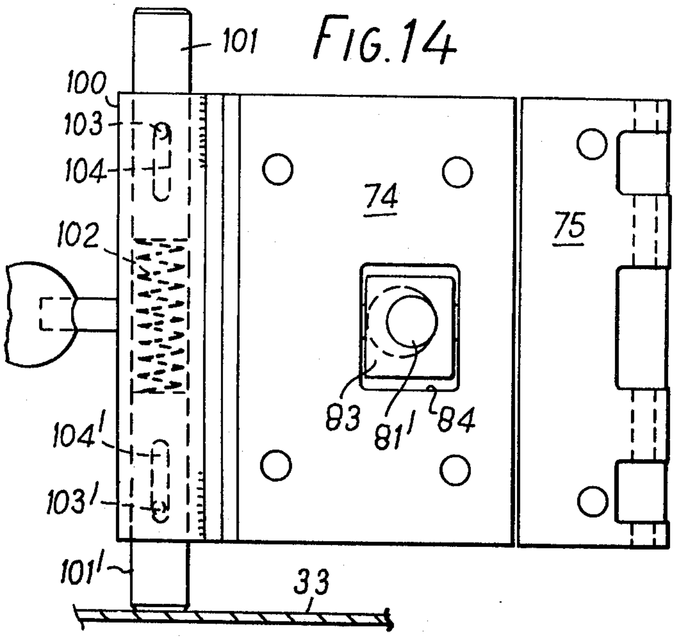
FIG. 14 is an elevational view of the unit shown in FIG. 13 with certain parts omitted for the sake of clarity.
Figure 15:
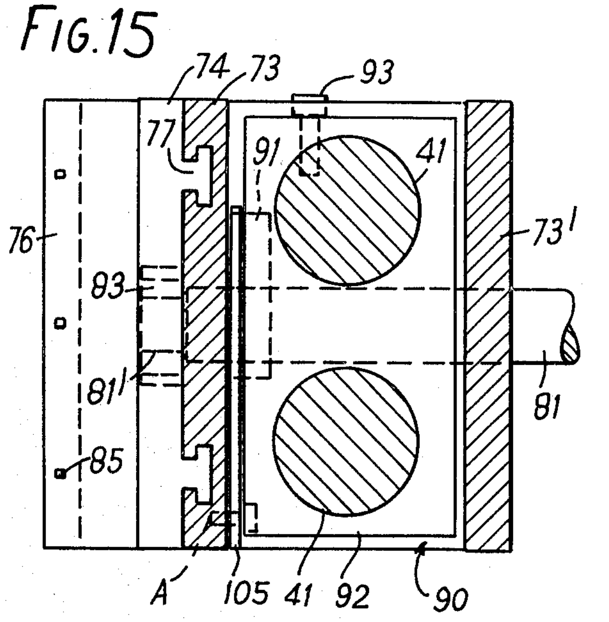
FIG. 15 shows a vertical section taken substantially along line 15—15 of FIG. 13.
Figure 16:
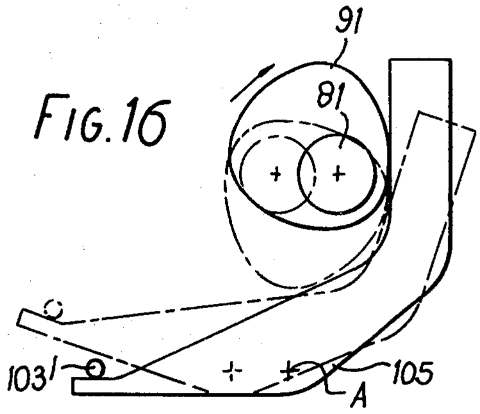
FIG. 16 is an elevational view showing diagrammatically a detail of the clamping unit of FIG. 13.

For the lateral location of the plates of the elements a plate 115 is journalled on a shaft 116 in the plate 75 (only shown in FIG. 13) which plate 115 carries a vertical tube 110 similar to the tube 100 and containing correspondingly mounted upper and lower abutting pins, of which the upper pin 111 is seen in FIG. 13. A spring 117 urges the plate 115 with the tube 110 out towards the open position as shown in the drawing. The plate 115 with the tube 110 is urged into closed position when the movable side rail 120 (FIG. 8) is moved towards a lug 119 on the plate 115 until a stop screw 118 threaded into the plate 115, engages the jaw 76'. By this arrangement it is ensured that the side edges of the flange plates will remain aligned in the vertical plane and at a predetermined distance from the longitudinal strips 4.

In the event that it is not desired that the edges of the flange plates shall be aligned, for example if the upper plate is shaped with a tongue along one edge and a corresponding groove along the opposite edge, it is clear that the location or aligning of the plates may be effected correspondingly by not using one guiding tube or sleeve with two abutting pins, but two separate tubes each having one locating pin for the top plate and the bottom plate, respectively, or the abutting portions of the pins may have different diameters.

When high (wide) web strips and a great member of punching elements 85 in the jaws 76 are used, it may be rather heavy to move the shaft 81 manually with the handle 82. It may then be preferable to rotate the shaft 81 in some other manner, for example with a nut wrench which may be driven pneumatically or electrically. Furthermore, it is clear that the closing of the jaws can take place in various ways, for example through hydraulic cylinders.

With reference to FIGS. 8, 17, 18 and 19 there will now be described aligning means ensuring that the longitudinal strips 4 along the element edges are held in correct positions between their fixation points. This function is performed by the side rails 120, 120' with the holders 140 and the aligning rulers 160.

Figure 18:
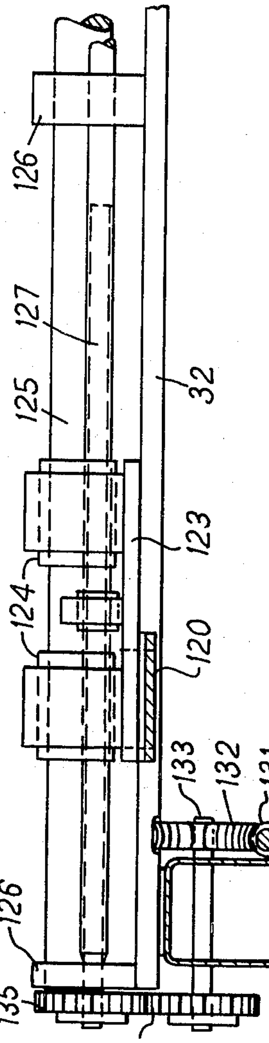
FIG. 18 shows a vertical section taken substantially along line 18—18 of FIG. 17.
Figure 17:
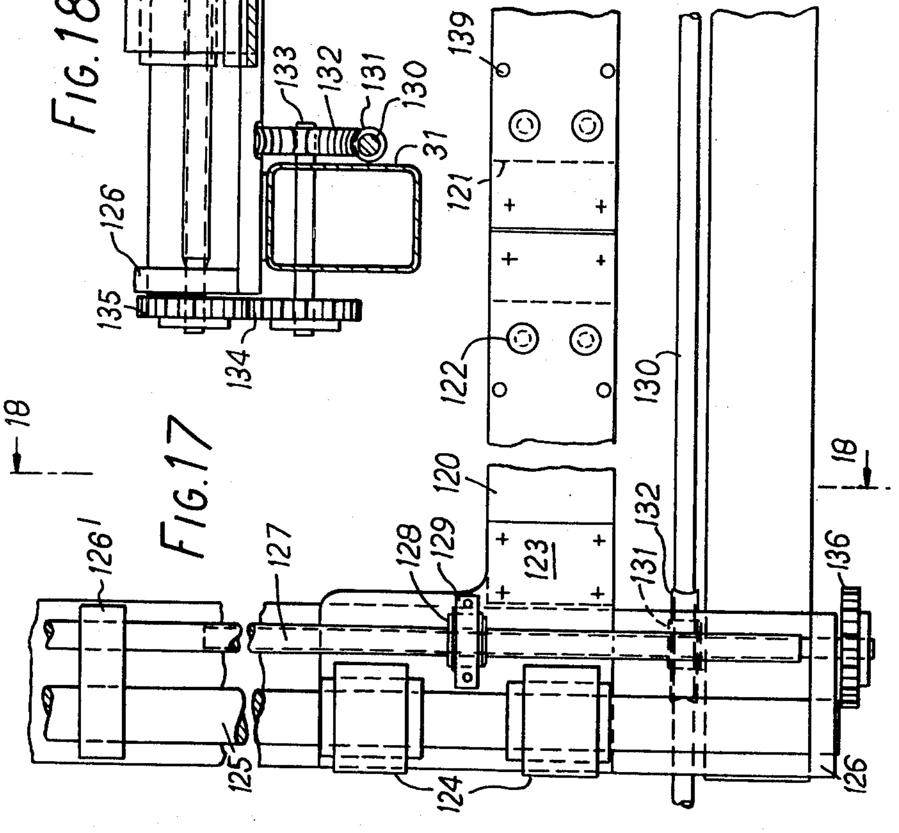
FIG. 17 shows a broken plan view the attachment of a movable side rail to the jig frame.

The side rails 120, 120' may preferably be steel flats as shown in cross-section in FIG. 18. The rail may be made in sections jointed by splice plates and screws as indicated at 121. On the bottom side of the rail are mounted ball rolls 122 suitably spaced, so as to permit the rail to move easily over the beam 31 and the bottom plate 33 of the jig. In each end the rail is fixed to a bracket 123 equipped with ball bushings 124 capable of running along a stationary transverse guide rod 125 fixed in stands 126, 126' on the jig frame. This arrangement ensures that the rail 120 at its ends is fixed against rotation in the horizontal plane, a fact which considerably increases the bending stiffness of the rail in the horizontal direction.

The two opposite side rails 120, 120' can be moved in parallel relation and synchronously towards and away from each other by means of a pair of transverse spindles 127 which are suitable journalled in the stands 126, 126' on the jig frame and which have oppositely threaded end portions passing through correspondingly threaded nuts 128 fixed in bearing blocks 129 on the respective brackets 123.

The two spindles 127, one on either end of the jig, are synchronized to a shaft 130 which extends along the jig frame and which is journalled in suitable bearings attached to the beam 31. This shaft is connected to each of the spindles 127 through a worm 131, a worm gear 132, a short transversal shaft 133 journalled in the beam 131, and gears 134, 135, as shown in FIG. 18.

The side rails 120, 120' can be moved by turning the shaft 130 by means of a motor not shown in the drawings.

Figure 19:
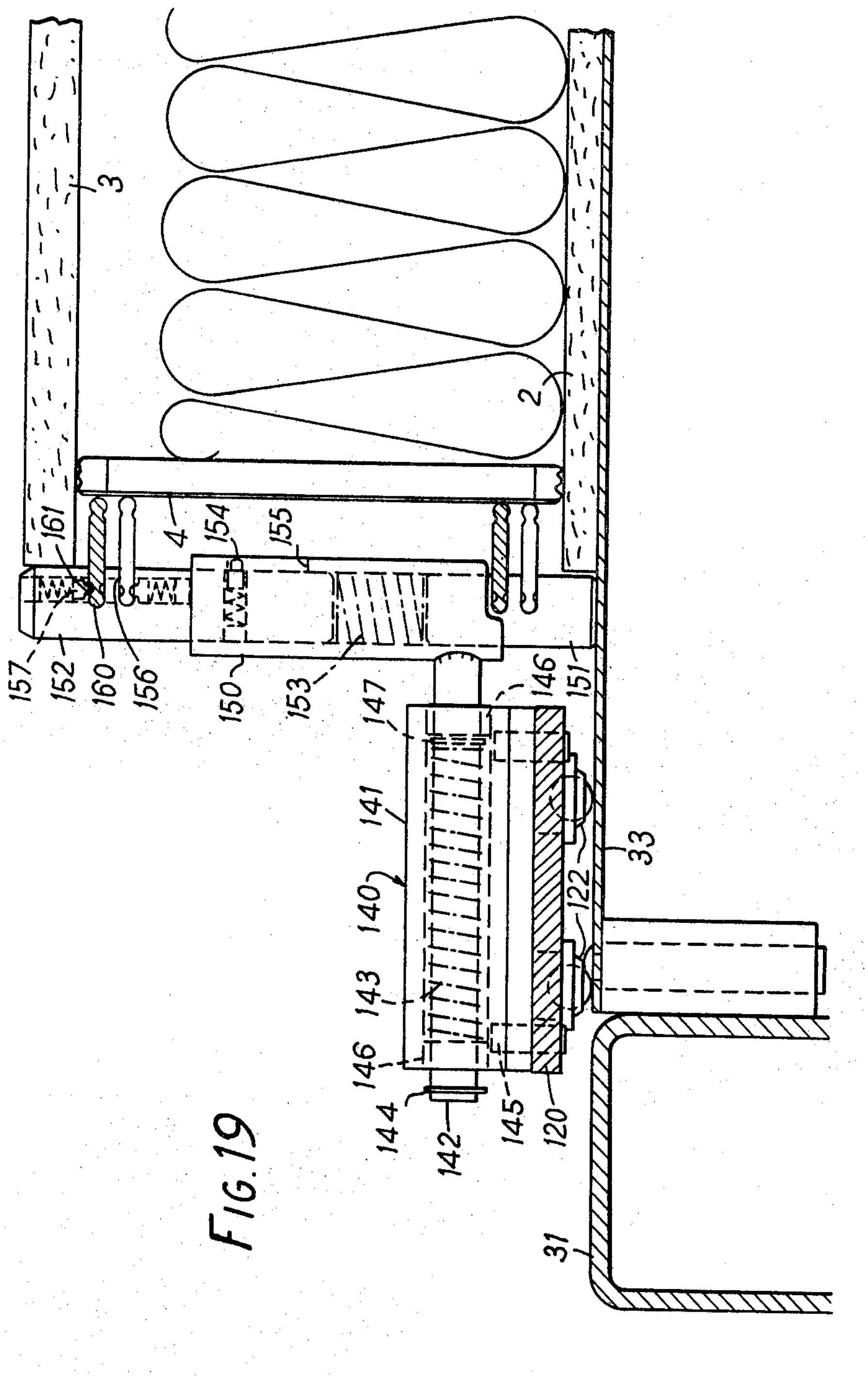
FIG. 19 shows in vertical section means for external support of a longitudinal web strip.

In FIG. 19 illustrates a holder 140 for the supporting and aligning rulers 160. The holder 140 comprises a sleeve 141 through which there passes a rod 142 which by the action of a pressure spring 143 and a stopping ring 147 on the rod is urged to the right in the drawing. The rod 142 slides in bearings 146 mounted in the sleeve 142. To the right end of the rod 142 there is fixed a vertical sleeve 150 which holds a fixed lower abutting pin 151 and an upper abutting pin 152 which can be pushed downwardly against the action of a compression spring 153. The movement of the pin 152 is limited by a stopping peg 154 movable along a slot 155 in the sleeve 150.

The abutting pins 151, 152 are formed with transverse grooves 156 receiving the rulers 160 which bear against the outside of the web strip 4 and are held in place in their respective grooves by spring-loaded locking pins 157 (only shown in the upper part of FIG. 19) mounted in the pins 151, 152 and having suitable semi-spherical end portions projecting into longitudinal grooves 161 in the rulers.

As shown, each of the abutting pins 151, 152 is formed with grooves 156 for two rulers. This is done to permit these sections of such rulers to overlap longitudinally whereby it becomes possible in a simple way to build up the desired length of lateral support.

As shown in FIG. 19, the holder 140 is detachably mounted on the side rail 120 with short pins 145 which are fixed in the sleeve 141 and fit into holes 139 (FIG. 17) drilled at suitable intervals in the rails 120.

The arrangement shown in FIG. 19 functions to ensure that the strip 4 will remain upright at the exact desired distance from the edges of the flange plates 2, 3 throughout the strip length between the clamping points. This is achieved by the abutting pins 151, 152 which are pressed against the edges of the flange plates, while the web strip 4 is pressed against the rulers 160 with a somewhat smaller outward pressure. This outward pressure may for example be provided by suitable insulating material such as mineral wool or similar material, placed inside the element, as indicated in the Figure.

Figure 8:
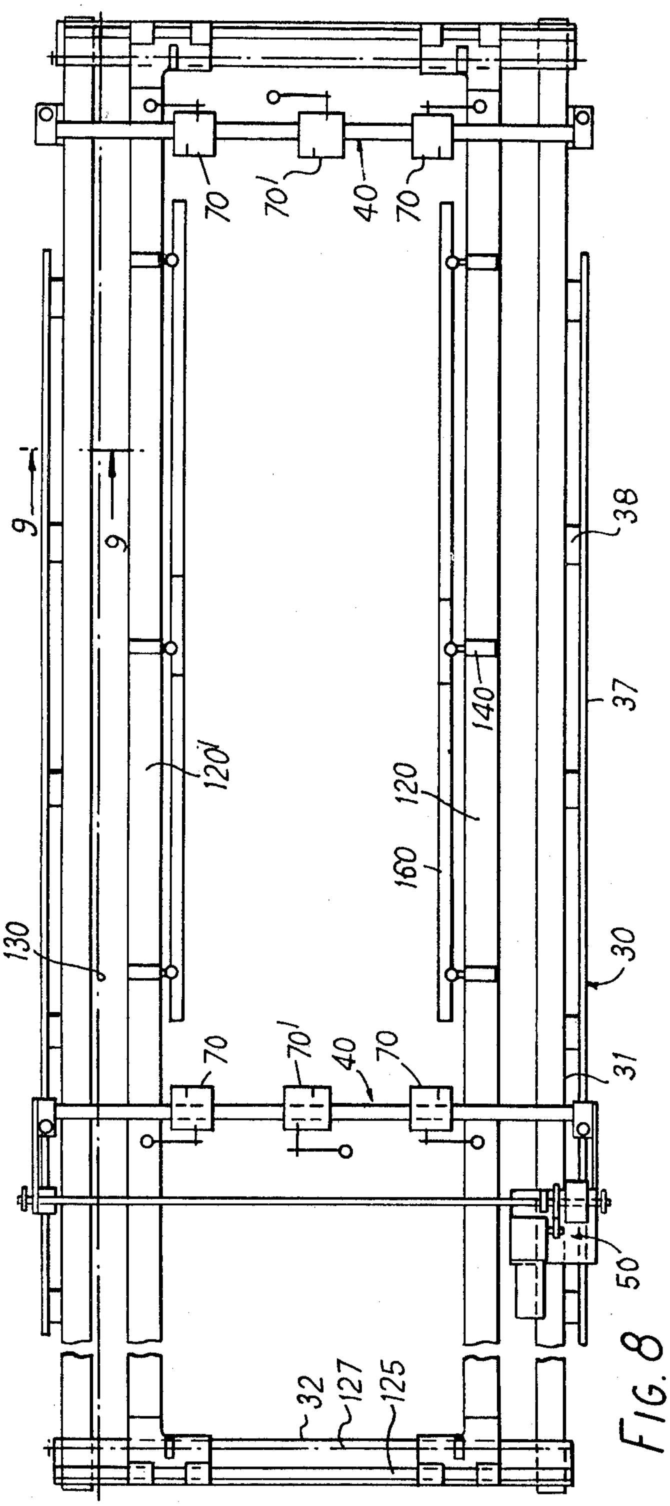
FIG. 8 is a broken plan view of a jig frame for the setting up of an element for pressing.

The following sets forth the manner in which an element of the type shown in FIG. 1 is set up for pressing in the jig shown in FIG. 8.

The lower plate 2 is placed on the bottom plate 33 of the jig, with one end edge abutting against the lower abutting pins of the fixed transom 40 to the right in FIG. 8. The movable transom 40 is then displaced a certain distance inwardly over the lower element plate in the direction toward the fixed transom. For this to be possible, it is necessary that the units 70 on the movable transom are in their open position, so that the abutting pins 101' (FIG. 14) are lifted and do not bear against the end of the lower plate 2. Thereafter the transverse web strips 5, with the folds 17' preferably already formed, but not yet completely pinched together, are placed between the jaws, 76, 76' of the respective units 70, 70'.

As previously mentioned, the longitudinal strips 4, 4' are cut to a somewhat shorter length, typically about 5% shorter, than the length of the element to be manufactured. These strips are cut along the line of symmetry in the trough-shaped depressions 17 as shown in FIG. 5*c*. The ends of the strips 4, 4' are now placed in the respective folds in the transverse strips 5, and the units 70, 70' are closed by means of the handles 82 as explained above. At the same time the deformation connections 21 are formed and the exterior units 70 are displaced somewhat outwardly along the respective transoms as a consequence of the cam element 91 pushing against the fixed element 92' (FIG. 13) whereby the end strips 5 are stretched. The lever 105 moves to its lower position (FIG. 16) so that the abutting pins 101' are free to be pushed downwardly toward the upper side of the lower plate 2. The movable transom 40 can then be moved rearwardly (towards the left in FIG. 8) by means of the driving unit 50 until the abutting pins 101' on the same come outside the left terminal edge of the lower plate 2. If required, the transom 40 is then moved a bit forwardly again in order to bring the abutting pins 101 to bear firmly against the edge of plate 2.

The longitudinal web strips 4 have now been stretched so strongly that warps and undesirable curvatures which always are present in such strips from the strip production process, have largely been eliminated, and the strips are standing as tensioned strings.

Now, the side rails 120, 120' with the holders 140 and the supporting rulers 160 are moved towards each other and thereby force the plate 115 with sleeve 110 to turn around the shaft 116 (FIG. 13) until the stopping screw 118 bears against the jaw 76. During this movement, which takes place in all the four corners of the element, one or two of the lower abutting pins in the sleeves 110 pushes the lower plate laterally to its correct position if the plate is not already lying correctly. The plate 2 will then be locked or clamped in the desired position relative to the corner joints 20 between longitudinal strips 4 and end strips 5.

As the side rails 120, 120' are moved towards each other, the abutting pins 151 in the holders 140 will come to bear resiliently against the longitudinal edges on the plate 2, and the rulers 160 ensure the desired distance between the strips 4 and the edges of the plate.

Insulating material may now be placed between the web strips. This material may preferably be mineral wool mats which are cut accurately in the direction of width so as to press the outer web strips 4 outwards towards the rulers 160. The internal longitudinal web strip 4 will be subject to approximately the same pressure on both sides and this fact together with the tension in the strip is sufficient for the strip to adjust itself to a reasonably correct position. Actually, the central strip will sometimes be standing somewhat out of plumb and also not completely straight as seen from above, but experience has shown that with the shape of the teeth and the strip profile shown in FIGS. 3 and 4 complete embedding of the teeth and an absolutely satisfactory connection between the web strip and the flange plates are achieved.

The top plate 3 can now be put in place abutting against the respective pins 101, 111 and 152, and the element is ready for pressing.

With reference to FIGS. 20 to 24 there will now be described an embodiment of an apparatus wherein the jig with the element set up therein is transported into and out from a press designed for stepwise pressing of long elements.

Figure 20:
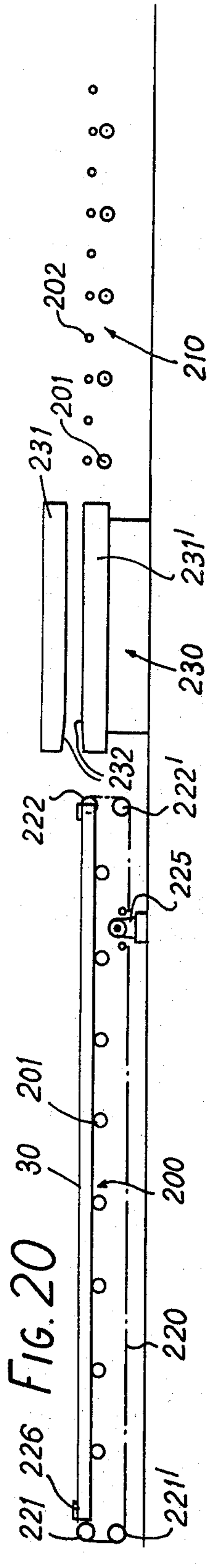
FIGS. 20 and 21 are diagrammatic views showing in elevation and plan, respectively, a manufacturing plant for the elements.

As shown diagrammatically in elevation in FIG. 20 the jig frame 30 rests on a wheel and roller track 200. The side beams 31 of the jig rest on stationary wheels 201 shaped with flanges affording lateral stability of the jig frame (also shown in dotted lines in FIG. 9). The bottom plate 33 of the jig rests on rollers 202. The supporting structure for the wheels and the rollers (FIG. 22) includes legs 203 bolted to the floor, and transverse beams 204 which carry longitudinal beams 205, 206 on which the wheels 201 are journalled. To the upper ends of the legs 203 are welded longitudinal beams 207 with a channel section, and a central longitudinal channel beam 208 is carried by short struts welded to the transverse beams 204. In the longitudinal beams 207, 208 the rollers 202 are journalled.

A drive chain 220 is arranged in an endless loop with its upper course in the channel beam 208 and its lower course suspended under the transverse beams 204. The chain is passed around sprocket wheels 221, 221', and 222, 222' at either end of the wheel and roller track 200. The chain is driven by a motor with a suitable brake, diagrammatically indicated at 225 in FIG. 20. The arrangement shown is such that the rear end of the jig, point 226 in FIG. 20, can only be moved up to the rear end of the roller track 200, approximately up to the sprocket wheel 222, so that the extreme rear portion of the jig cannot be utilized for accomodating the element. Although this means that some space is lost, this arrangement has the advantage that a walking passage is obtained between the wheel and roller track 200 and the press 230, a fact which very considerably facilitates the operation of the manufacturing line.

Figure 21:
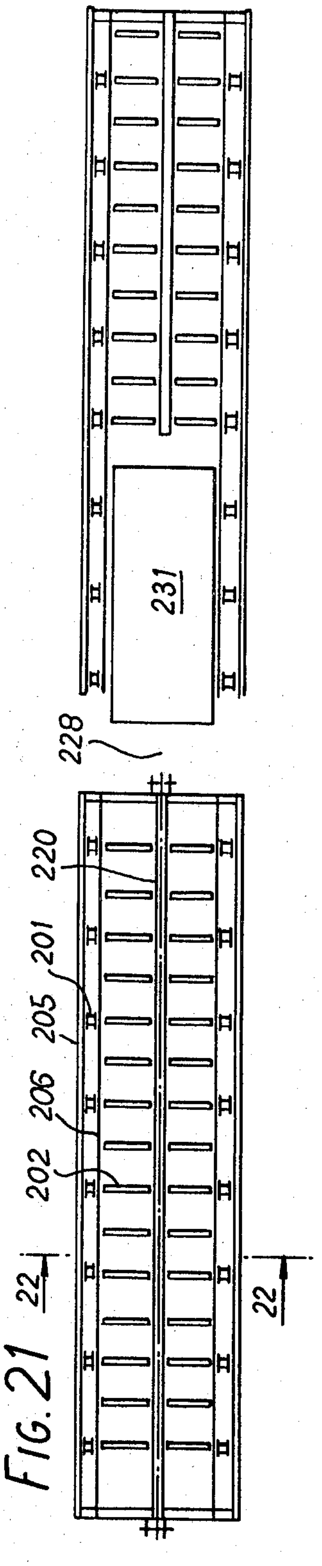
Figure 22:
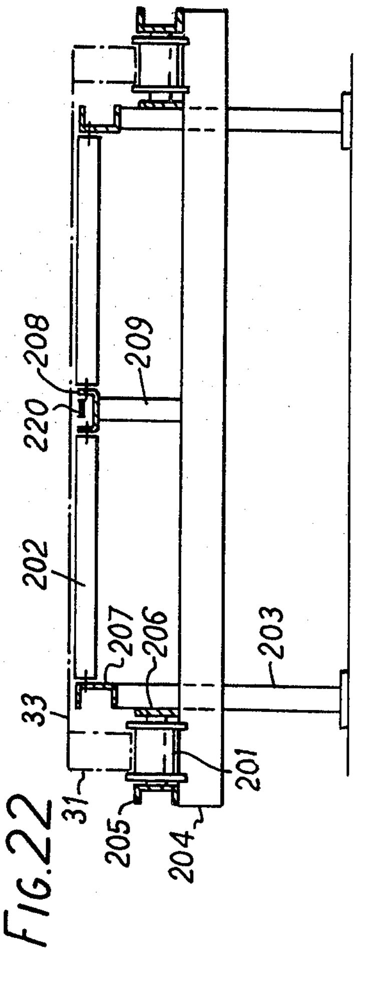
FIG. 22 shows on an enlarged scale a wheel and roller track in cross-section taken substantially along line 22—22 of FIG. 21.

As shown in FIG. 21, along the sides of the press plate 231' there are also provided stationary wheels for supporting the jig frame, and furthermore, on the rear side of the press, to the right in FIGS. 20 and 21, there is mounted a wheel and roller track 210 of a similar design as the track 200, but without the chain drive 220, so that it is possible to move the jig into and through the press as far as the length of the set up element requires, with the limitation stated above.

As shown in FIGS. 20 and 21 the press 230 is considerably shorter than the longest element which the jig 30 can accommodate. For reasons of clarity, only the press plates are shown, and it is assumed that the lower press plate is fixed while the upper press plate moves up and down. The press may be hydraulic or mechanical and may be of known design, apart from one detail which will be discussed below. It is, however, of considerable importance that the upper press plate is guided vertically, so that during the working stroke it will move in parallel relation to the lower press plate, without any horizontal displacement in the longitudinal or transverse direction. Furthermore, it is required that the movable press plate will stop its movement when the element has been pressed to the exact desired height, regardless of the pressing force or specific pressure which might be attained. In other words, the press must be controlled by movement rather than by force. The design of a suitable press does not involve specific or unusual problems and can be preformed with well known technology.

Figure 23:
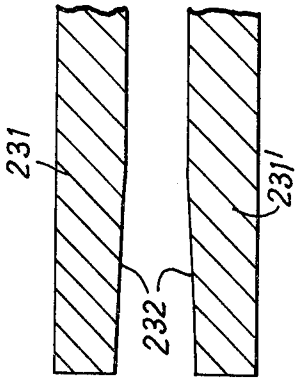
FIG. 23 shows an enlarged and somewhat exaggerated view of the shape of the entrance end of the press plates in longitudinal vertical section.

As shown in FIG. 20 and somewhat exaggerated in FIG. 23, the press plates are shaped with gently converging end portions 232 at the entrance end. This makes it possible to press long elements in several steps. The converging portions 232 then function to provide a smooth transition between that part of the element which in one pressing step is being pressed completely and that part of the element which is not yet pressed, so that the flange plates 2, 3 will attain a smooth and well controlled curvature which is well within that maximum deformation to which the plate material can be subjected without damage. Experiments have shown that a particle board plate is more or less sheared off if one attempts to press an element in steps with ordinary flat press plates without a transition zone as described.

In FIG. 23 the transition portion 232 is shown with a gentle S-shaped curvature with horizontal end tangents. Such a curve may be expressed mathematically as a trigonometric function or as a polynomal function or may simply be designed graphically. The transition zone 232 may also be made up of a number of inclined surfaces or simply be one inclined plane of sufficient length. The main point is, as mentioned above, that a smooth transition is achieved between the completely pressed and the not yet pressed part of the element with a continuously decreasing embedding of the web teeth into the flange plates 2, 3. The extremities of the transition zone should consequently be at levels with a difference corresponding to the penetration depth of the teeth in the respective plates, that is the length of the teeth.

FIGS. 24*a–d* illustrates diagrammatically four situations during the pressing of a long element, corresponding to two pressing steps. For the sake of clarity, the web plates 2, 3 of the element has been shown as single lines, and difference between the levels of the extremities of the transition portion is somewhat exaggerated.

Figures 24A, 24B, 24C, 24D:
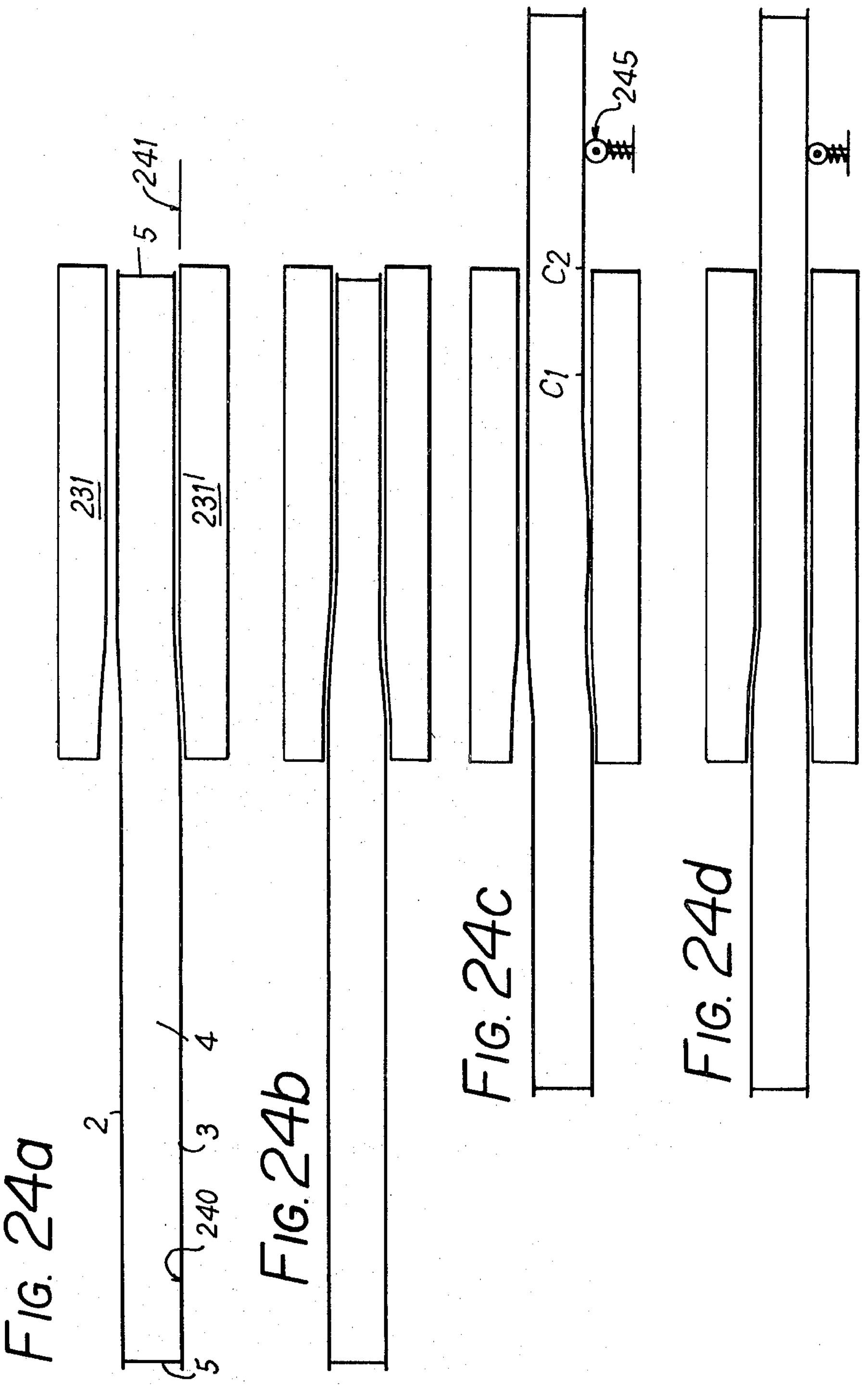
FIG. 24*a–d* are diagrammatic elevational views showing different stages of a stepwise pressing of long elements.

FIG. 24*a* shows the setup element as it has been transported into the press, but before the first stage has been pressed. The plates 2, 3 and the web strips 4 are then not structurally interconnected and the individual components adjust themselves to the shape of the lower press plate. It is to be noted that the front part of the element with the front end strip 5 is lifted somewhat relative to the entrance level 240 and therefore also relative to the jig frame, which in all positions lies at the same level (the top of the beam 31 is at level 240). In order to follow this lifting movement the bottom plate 33 of the jig is mounted vertically movable relative to the jig frame 31, 32 as mentioned in connection with FIG. 8, and the transoms 40, to which the web strips are clamped, can also move somewhat in the vertical direction relative to the frame 31, 32 (see FIGS. 10 to 12).

FIG. 24*b* shows the situation after the first part of the element has been pressed. During the pressing the bottom plate of the jig and the foremost transom 40 move down again to the normal position. After pressing, the upper press plate 231 is lifted anew, and the jig 30 is moved forward to the position shown in FIG. 24*c*, where the major part of the pressed element protrudes outside the press, while a smaller part C1–C2 lies in the press in order to guide the element so that the part being pressed in the second stage will be aligned with the part already pressed, and hence the element becomes straight. As indicated in FIG. 24*c*, one or more spring-loaded rollers 245 may be used as a temporary support for the protruding part of the element.

FIG. 24*d* shows the situation after pressing of the second stage, that is with the press plates in the same position as in FIG. 24*b*. The pressing of the remaining stages takes place in a manner similar to what has been explained above.

Thus, the production of an element includes the setting up of the element in the jig as described above. The jig then lies on the wheel and roller track 200 as shown in FIG. 20. By means of the chain drive 220 the jig is pulled into the press and stops in the position shown in FIG. 24*a*. The upper press plate goes down and presses the element to the desired height (thickness). The upper press plate goes up, and the jig is moved one step forward into the press, whereafter the next portion is pressed. This is repeated until the whole element has been pressed.

Thereafter the jig is pulled back to its starting position. In order to be able to lift the element out of the jig it is necessary first to move the side rails 120, 120' away from each other. Thereafter the clamping units 70, 70' on the fixed transom 40 are opened. This is done by turning the shafts 81 in the respective units about 90° (FIG. 13) so that the jaws 76, 76' move away from each other, but not so much that the excentrics 91 attempt to move the units inwards on the transoms, since the channel folds on the end strips 5 in which the longitudinal web strips 4, 4' are locked, have now been fixed to the flange plates 2, 3 and therefore prevent such movement. Thereafter the movable transom 40 is driven rearwardly (to the left in FIG. 8), so that the element can be pulled away from the fixed transom 40. Now the clamping units 70, 70' on the movable transom 40 are opened, and this movable transom is then driven still further backwards so that the element will lie freely on the bottom plate 33, whereafter it can be lifted out of the jig with a suitable hoisting device.

It is possible to make the stepwise movement of the jig through the press and the appurtenant activation of the press automatic, so that no manual operation is required from the moment when the jig starts its movement towards the first pressing position till the moment when it returns to its starting position. This can be done with known technology.

Also it is obvious that it is possible to make various modifications, substitutions, omissions and additions to the manufacturing apparatus and method described above and shown in the drawings, within the scope of the invention as defined in the appending claims.

What I claim is:

1. A method of manufacturing a construction element of a predetermined length which includes a pair of spaced apart plates of nailable material and web strips having teeth along longitudinal edges thereof projecting into said plates for connecting them together, comprising the steps of providing elongated sheet metal web strips each of sinuous cross-section in a longitudinal direction and each of a first length in an untensioned condition, gripping the web strips at opposite ends thereof, moving said ends oppositely away from one another along said longitudinal direction until each of said strips has a second length in a tensioned condition greater than said first length, disposing said plates along said edges and perpendicular to said web strips, and while maintaining said strips in said tensioned condition, pressing said plates and said web strips together so as to embed said teeth into said plates.

2. A method according to claim 1, wherein a first set of said strips are disposed longitudinally of said plates and a second set of strips, including two strips having narrow folds formed therein, are disposed transversely of said plates, and wherein for said gripping and moving of the ends of the elongated web strips the ends of the strips of said first set are accommodated in respective ones of said folds of the two strips of the second set, and these are clamped from the outside by the use of clamping means which are then displaced in longitudinal and transverse directions, respectively, of the strips of said first and second sets and which are actuated for pinching these folds onto the ends thus accommodated.

3. A method according to claim 2, wherein in connection with the clamping of the folds, deformations are punched in the jointed folds and strip ends by punching means provided on said clamping means, so as to lock these jointed portions against mutual displacement transversely of said strips.

4. A method according to claim 1, wherein a press of a working length smaller than the predetermined length of the element to be manufactured is provided for carrying out the pressing step, and wherein after the gripping and moving operations the element is moved stepwise through the press for stagewise pressing and wherein by each pressing operation except the last one there is pressed a portion of the element which converges as a smooth transition between that part of the element which is completely pressed and that part of the element which is not yet pressed together.

5. A method according to claim 1, wherein the plates are of substantially the same size, and which method includes placing the untensioned web strips and the plates in a movable clamping frame on which clamping means are mounted, these clamping means being mutually displaceable and activatable and displaceable for gripping and moving said ends, and on which there are also mounted mutually displaceable locating means for effecting alignment of the end edges of the plates relative to each other and to the web strips, moving the frame into a press for pressing of the element after the gripping, moving and aligning operations are completed, and manipulating the clamping and locating means for releasing the element.

6. A method according to claim 5, wherein as locating means for the mutual alignment of the plates at the ends thereof, spring-loaded abutment means are provided which are connected to the clamping means and which are displaced mutually together with the clamping means and which also can move resiliently in a transverse direction relative to the strips, so that on moving the ends of the web strips a displaced first one of the abutment means moves past the corresponding edge of the first one of the plates and snaps out in front of that edge under the spring-load and wherein in the press all the said abutment means are moved transversely together by the press.

7. A method according to claim 5 wherein a first set of the web strips are disposed longitudinally of said plates and are supported between the respective clamping means against outward transverse displacement by longitudinal rulers placed on the outside surfaces of the first web strips while these web strips are supported on their inside surfaces by material placed within the element.

8. A method according to claim 7, wherein the rulers are brought into correct position relative to the plates by being spring-loaded inwardly towards the respective web strips and are connected to abutment means which engage the end edges of the plates and are retractable in a direction transversely to said strips.

* * * * *